US012420906B2

(12) United States Patent
Machado et al.

(10) Patent No.: US 12,420,906 B2
(45) Date of Patent: Sep. 23, 2025

(54) HYBRID SURFACE DESIGNS WITH PASSIVE DIFFUSION-LIMITED DEPOSITION CAPABILITIES

(71) Applicant: Northwestern University, Evanston, IL (US)

(72) Inventors: Christian John Machado, Evanston, IL (US); Kyoo-Chul Kenneth Park, Evanston, IL (US); Jiaxing Huang, Wilmette, IL (US); Haiyue Huang, Evanston, IL (US)

(73) Assignee: Northwestern University, Evanston, IL (US)

( * ) Notice: Subject to any disclaimer, the term of this patent is extended or adjusted under 35 U.S.C. 154(b) by 293 days.

(21) Appl. No.: 17/695,990

(22) Filed: Mar. 16, 2022

(65) Prior Publication Data

US 2022/0297819 A1    Sep. 22, 2022

Related U.S. Application Data

(60) Provisional application No. 63/280,476, filed on Nov. 17, 2021, provisional application No. 63/161,803, filed on Mar. 16, 2021.

(51) Int. Cl.
*B64C 3/36* (2006.01)
*B05D 5/08* (2006.01)

(52) U.S. Cl.
CPC . *B64C 3/36* (2013.01); *B05D 5/08* (2013.01)

(58) Field of Classification Search
CPC ............ B64D 15/00; B32B 3/085; B32B 3/10
See application file for complete search history.

(56) References Cited

U.S. PATENT DOCUMENTS

| 2004/0028875 | A1* | 2/2004 | Van Rijn | B01D 67/0018 264/299 |
| 2014/0011013 | A1* | 1/2014 | Jin | H10F 77/707 438/57 |
| 2018/0194619 | A1* | 7/2018 | Greer | B05D 1/18 |

FOREIGN PATENT DOCUMENTS

WO    WO-2020033690 A1 *  2/2020  ............... B21D 5/16

OTHER PUBLICATIONS

Yuehan Yao et al., "Frost-free zone on macrotextured surfaces," *PNAS*, Mar. 24, 2020, vol. 117, No. 12; pp. 6323-6329.
Ozcan Yirtici et al., "Predictions of ice formations on wind turbine blades and power production losses due to icing," *Wind Energy*, 2019, Issue 22; pp. 945-958. wileyonlinelibrary.com/journal/we.

(Continued)

*Primary Examiner* — Alicia J Weydemeyer
(74) *Attorney, Agent, or Firm* — Bell & Manning, LLC

(57) ABSTRACT

A surface texture includes a three-dimensional structure, a cross-section of which includes a first serration and a second serration. The first serration has a first peak having a height measured from a base of the three-dimensional structure to a top of the first serration. A valley is formed in between the first serration and the second serration, where the valley has a length measured from a base of the first serration to a base of the second serration. The first serration also has a vertex angle that forms the first peak. A coating that covers at least a portion of the valley, where the valley is designed to remain free of frost.

13 Claims, 16 Drawing Sheets

(56) References Cited

OTHER PUBLICATIONS

Lance H. De Koninck et al., "Passive anti-frosting cables," *International Journal of Heat and Mass Transfer*, 2020, vol. 146; pp. 118808 (1-7).

Alistair M. Hetherington et al., "The role of stomata in sensing and driving environmental change," *Nature*, Aug. 21, 2003, vol. 424, pp. 901-908.

\* cited by examiner $$Frost\ Free\ Zone: \varphi = \frac{A_{unfrosted}}{A_0}$$

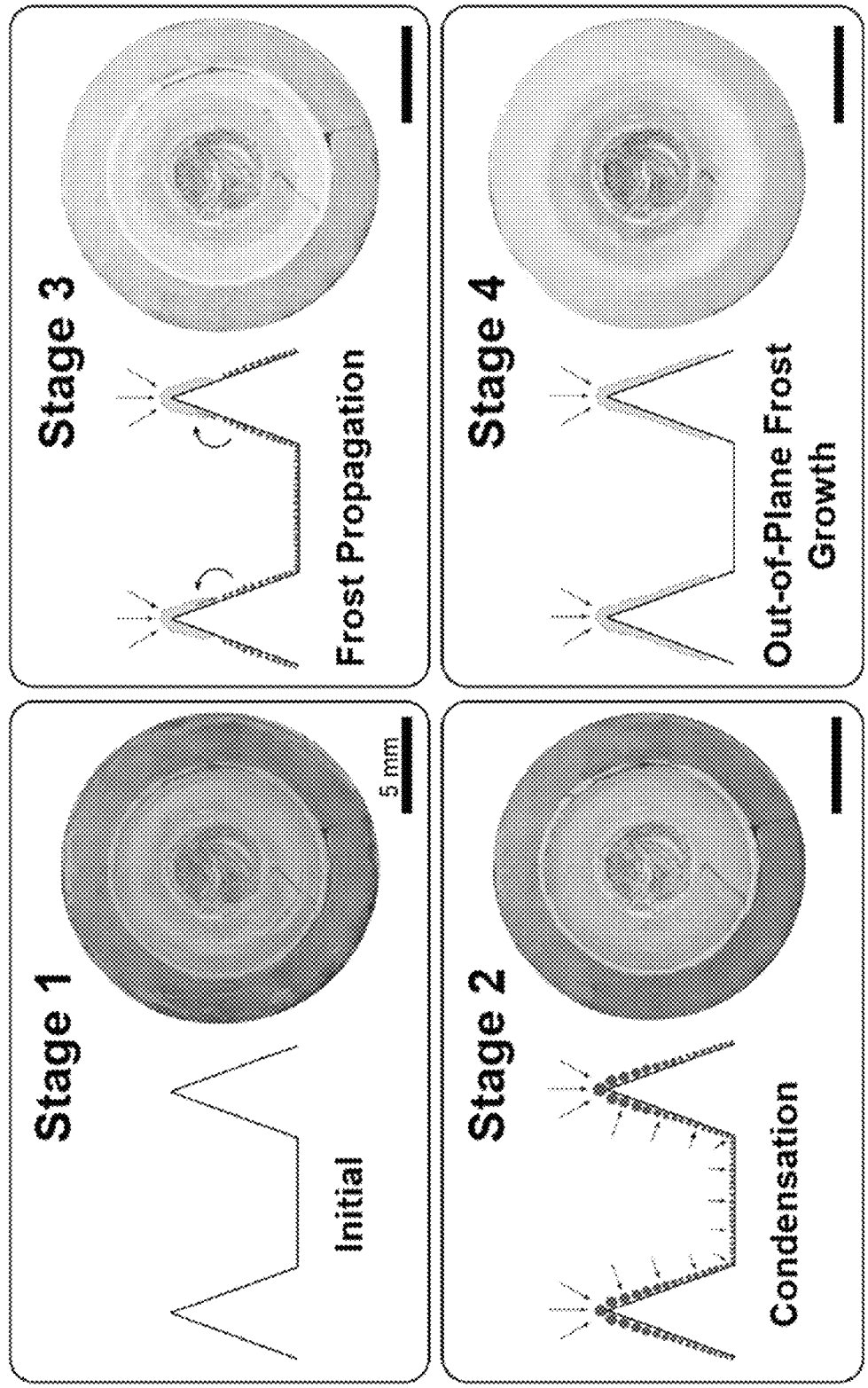

$$\frac{\partial c}{\partial t} = D \cdot \nabla^2 c \to \nabla^2 c = 0 \; (steady\; state)$$

HYBRID SURFACE DESIGNS WITH PASSIVE DIFFUSION-LIMITED DEPOSITION CAPABILITIES

CROSS-REFERENCE TO RELATED APPLICATION

The present application claims the priority benefit of U.S. Provisional Patent App. No. 63/161,803 filed on Mar. 16, 2021 and U.S. Provisional Patent App. No. 63/280,476 filed on Nov. 17, 2021, the entire disclosures of which are incorporated by reference herein.

BACKGROUND

Ice can form as a result of a deposited liquid (e.g., rain) on a surface in combination with freezing temperatures. Ice formation can also result from condensation in the air that forms on surfaces during freezing temperatures. As a result, surfaces that are exposed to freezing conditions often result in frost/ice adhesion. As an example, this can be realized by frost formation on aircraft wings, which poses a serious danger. Frost formation in freezers poses a significant decrease in thermal efficiency, among many other problems. Frost can also form on overhead power lines and telephone lines, and a significant frost build-up can result in broken lines, which can cause power outages and cause an electrical safety hazard.

SUMMARY

An illustrative surface texture includes a three-dimensional structure, a cross-section of which includes a first serration and a second serration. The first serration has a first peak having a height measured from a base of the three-dimensional structure to a top of the first serration. A valley is formed in between the first serration and the second serration, where the valley has a length measured from a base of the first serration to a base of the second serration. The first serration also has a vertex angle that forms the first peak. A coating that covers at least a portion of the valley, where the valley is designed to remain free of frost.

In some embodiments, the coating comprises a two-dimensional nano-coating. In one embodiment, the two-dimensional coating comprises a graphene oxide coating. Alternatively, the coating comprises a three-dimensional lattice framework. In one embodiment, the coating has a thickness between 1 micron and 225 microns. In another embodiment, the coating covers all of the valley. In an illustrative embodiment, an exterior surface of the three-dimensional structure has a shape of a truncated cone. In another embodiment, the height of the first peak is between 0.5 millimeters (mm) and 10 mm. The length of the valley can be between 3 millimeters (mm) and 10 mm in one embodiment.

In another embodiment, the coating is configured to manipulate an overall diffusion field of the surface texture by adsorbing or desorping vapor from the atmosphere. Also, the valley can be planar such that the three-dimensional structure includes a planar frost free zone. In another embodiment, the height and the vertex angle are controlled such that freezing of condensate begins at the first peak, and the freezing of condensate propagates from the first peak down toward the valley. During propagation of the freezing condensate from the first peak down toward the valley, the condensate is present on the three-dimensional structure as both a solid and a liquid. The presence of the condensate on the three-dimensional structure as both the solid and the liquid generates a concentration gradient that forms as a result of a difference between a first saturation pressure of the solid and a second saturation pressure of the liquid. This concentration gradient causes evaporation of condensate present in the valley.

An illustrative method of forming a surface texture includes forming a three-dimensional structure such that a cross-section of the three-dimensional structure includes a first serration and a second serration. The method also includes forming the first serration to have a first peak with a first height measured from a base of the three-dimensional structure to a top of the first serration. The method also includes forming the second serration to have a second peak with a second height measured from a base of the three-dimensional structure to a top of the second serration. The method also includes forming a valley in between the first serration and the second serration, where the valley has a length measured from a base of the first serration to a base of the second serration. The method also includes forming the first serration to have a first vertex angle that forms the first peak and forming the second serration to have a second vertex angle that forms the second peak. The method further includes applying a coating to cover at least a portion of the valley such that the valley remains free of frost.

In one embodiment, applying the coating comprises applying a two-dimensional nano-coating, where the two-dimensional coating comprises a graphene oxide coating. In another embodiment, applying the coating comprises applying a three-dimensional lattice framework. In some embodiments, applying the coating comprising covering all of the valley with the coating. In another embodiment, the three-dimensional structure is formed having an exterior surface in a shape of a truncated cone.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3 depicts the four primary stages of frost formation in accordance with an illustrative embodiment.

DETAILED DESCRIPTION

Described herein are methods and systems to help prevent frost buildup. The proposed methods and systems were motivated by various problems associated with frost/ice accumulation. For example, frost can form on aircraft wings and cause potentially catastrophic effects like reduced lift and increased weight. The inventors are also concerned with the added weight of frost/ice on such things like power lines, which can lead to outages. Additionally, frost/ice can be problematic for applications such as sensing and photography due to the problem of light diffraction through ice crystals. The inventors have thus considered how to create a frost free zone that is planar for use in sensing, photography, and other applications.

Figure 1:
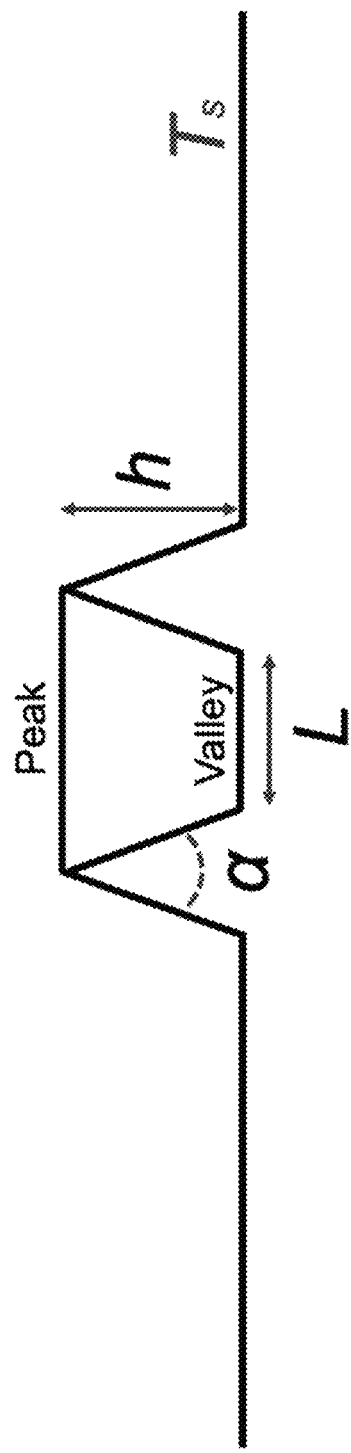
FIG. 1 is a two-dimensional depiction of a surface texture in accordance with an illustrative embodiment.

In an illustrative embodiment, a surface texture with several design parameters is used for frost prevention. FIG. 1 is a two-dimensional depiction of a surface texture in accordance with an illustrative embodiment. As discussed in more detail below, the two-dimensional depiction of FIG. 1 is a cross-sectional view of a three-dimensional structure that is designed to have a frost free zone. Such structure can be made from plastics, metals, or any other rigid material, as the effects of the design are completely independent of interfacial characteristics. As shown, the surface texture is formed by a pair of peaks and a valley (i.e., a pair of serrations separated by a planar valley). Although a single surface texture is depicted, it is to be understood that a plurality of such surface textures can be used to cover an entire surface or a subsection of an entire surface of an object.

The surface texture includes several design parameters that are defined and that can be manipulated to control the frost prevention effect on the surface. These design parameters include a length (L) of a planar region (or valley) formed at a base of the peaks. In one embodiment, L can have a value of 5 millimeters (mm). Alternatively, other values may be used such as 1 mm, 2 mm, 3 mm, 4 mm, 7 mm, 9 mm, 10 mm, 15 mm, etc. Another design parameter is the height (h) of the peaks. The height h can be 6 mm in one embodiment. Alternatively, other heights may be used such as 1 mm, 2 mm, 4 mm, 8 mm, 12 mm, etc. Another design parameter is the vertex angle (alpha, a), which defines the extent of sharpness of the serration that forms the surface texture. As alpha approaches 180 degrees, the surface texture becomes a very oblique feature. As alpha approaches 0 degrees, the surface texture becomes very acute. The experiments and testing described herein show that as a is increased (i.e. when the serration becomes more broad), the magnitude of the evaporative flux decreases. Experimentally, that was confirmed by observing condensed liquid remaining and freezing in the valley for surfaces with large a.

Figure 2A:
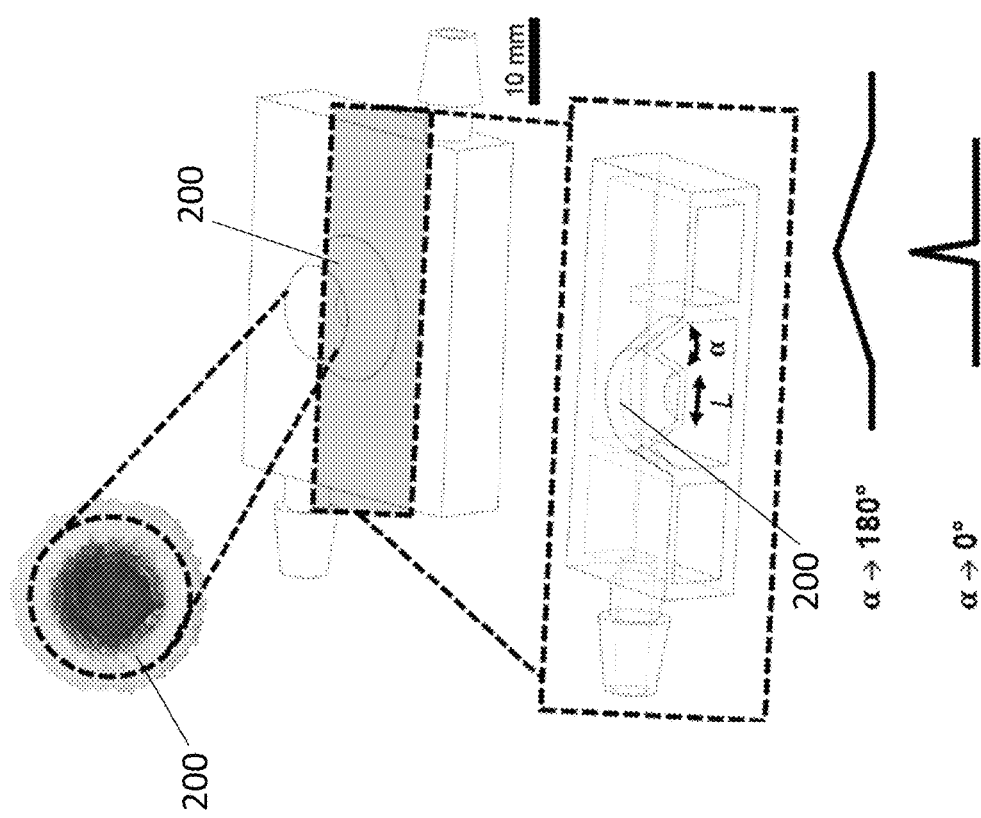
FIG. 2A depicts a three-dimensional (3D) surface texture incorporated into a test system in accordance with an illustrative embodiment.

FIG. 2A depicts a three-dimensional (3D) surface texture 200 incorporated into a test system in accordance with an illustrative embodiment. The 3D surface texture 200 was formed by revolving the serration (depicted in FIG. 1) concentrically to create a shape in the form of a truncated cone on its exterior. For testing purposes, the 3D surface texture 200 was printed as a hollow shell such that a circulating coolant can flow through the shell and uniformly cool the surface thereof. The experimental test system was set up such that frost resistance could be studied on the surface of the generated 3D surface texture.

Figure 2B:
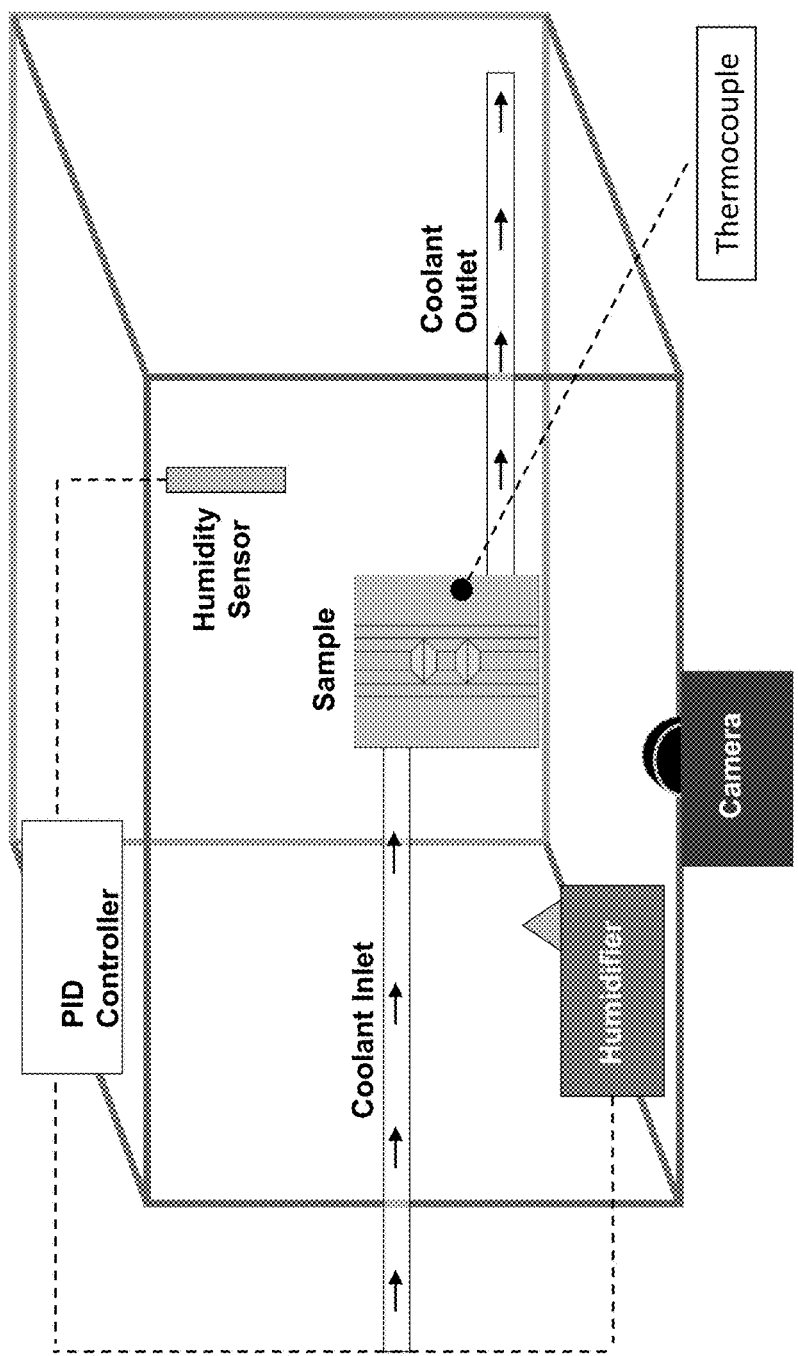
FIG. 2B is a detailed view of the test system used to validate the three-dimensional surface texture in accordance with an illustrative embodiment.
Figure 2C:
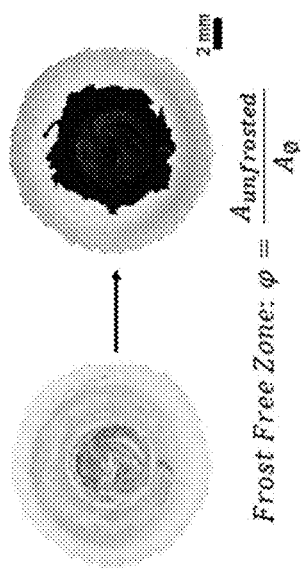
FIG. 2C depicts the frost resistance ratio, phi, in accordance with an illustrative embodiment.

FIG. 2B is a detailed view of the test system used to validate the three-dimensional surface texture in accordance with an illustrative embodiment. As shown, the system includes a coolant inlet such that coolant flows to the sample (i.e., the 3D surface texture), and coolant outlet by which coolant exits the test system. The system also includes a humidifier, a proportional integral derivative (PID) controller, a humidity sensor, a thermocouple, and a camera. In operation, the 3D surface texture is cooled using a circulating coolant. In one embodiment, the coolant can be ethylene glycol at a temperature of −19° Celsius, which results in a surface temperature of −8° Celsius on the 3D surface texture. Alternatively, a different coolant and/or temperatures may be used. The thermocouple is used to detect the surface temperature of the sample being tested. The humidity is increased using the humidifier, and the humidity is maintained by controlling the humidifier by the PID controller, which is connected to the humidity sensor. Thus, the inventors were able to control the supersaturation that was applied to the test surfaces. The camera is used to take interval images of the test surface over time. The captured images were thresholded in order to determine the projected surface area that remains unfrosted on the 3D surface texture, and to normalize that to the unit area to achieve a frost resistance ratio, phi. FIG. 2C depicts the frost resistance ratio, phi, in accordance with an illustrative embodiment.

Upon experimenting with these surfaces, the inventors noticed that entire frosting process can be divided into four main stages. FIG. 3 depicts the four primary stages of frost formation in accordance with an illustrative embodiment. In FIG. 3, each stage depicts the surface in two dimensions and in three-dimensions. Stage 1 is the initial surface which has no condensed material on it. In stage 2, as the surface is exposed to a supersaturation, one sees condensed liquid droplets deposit nonuniformly on the surface, where the largest droplets are observed at the peaks and the smallest droplets are observed in the concave regions and the valley. One sees condensation rather than direct de-sublimation because that is what is thermodynamically preferred at most supersaturation degrees (and certainly those that were tested in the test system of FIG. 2B). In stage 3, initial droplets freeze first at the peaks, because the majority of liquid droplets are there. Due to direct ice bridging, one sees the freezing begin to propagate along the peak, and then down the serration en route to the valley. During this time when there is both frost and liquid water, there is a concentration gradient that forms as a result of the difference between saturation pressures of the two phases. It was discovered that the concentration gradient actually ends up driving evaporation of the droplets farther down the surface (i.e., toward the valley). In stage 4, the evaporation gets to a point where all the remaining liquid droplets evaporate before they can freeze, and this stalls any further propagation of the frost front. This creates the frost resistance and, once that happens, any further diffusion flux of water vapor will be primarily used for out-of-plane frost growth, as opposed to covering additional area of the surface.

Figure 4A:
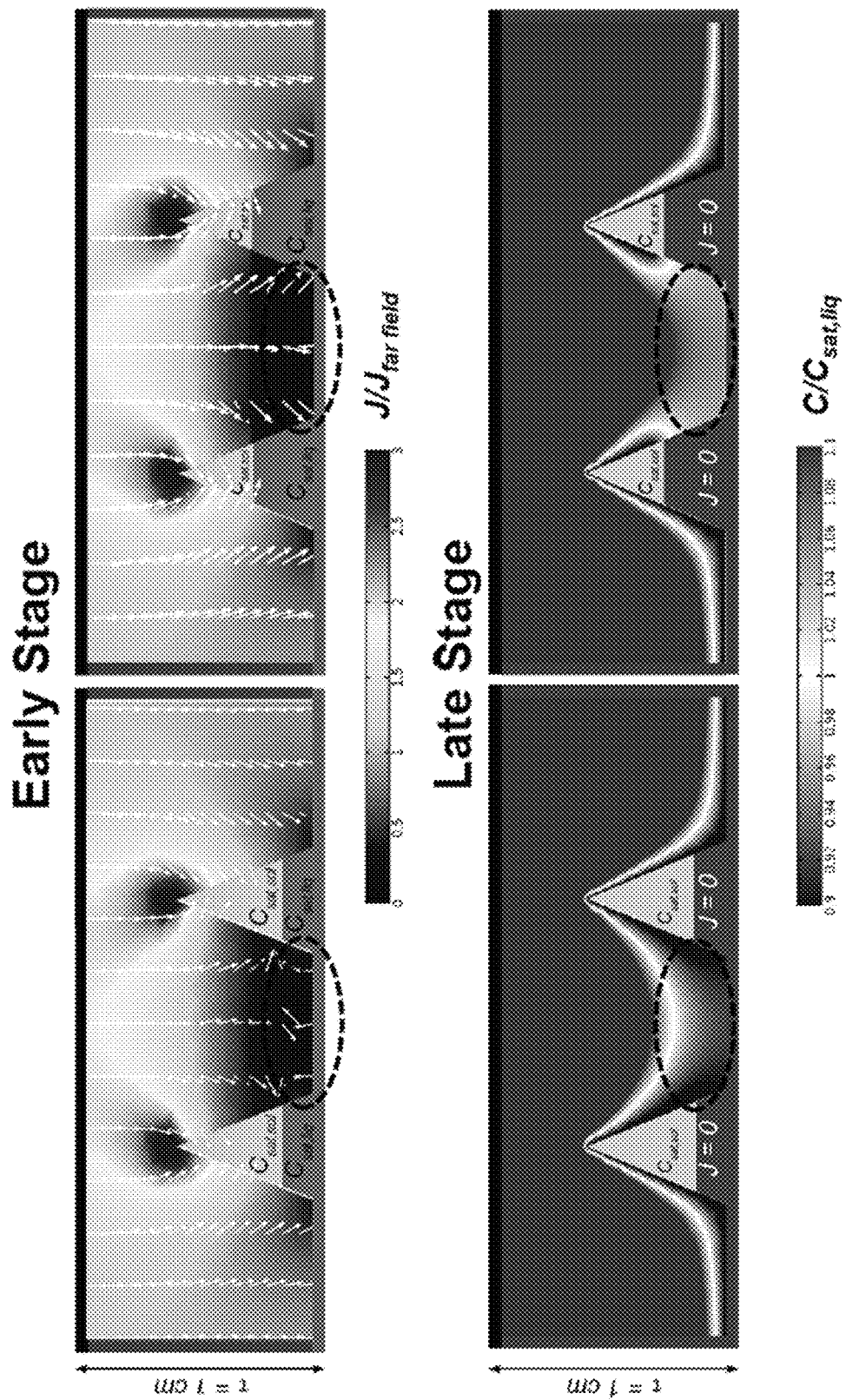
FIG. 4A depicts early stage and late stage frost formation computer simulations of the proposed surface texture in accordance with an illustrative embodiment.
Figure 4B:
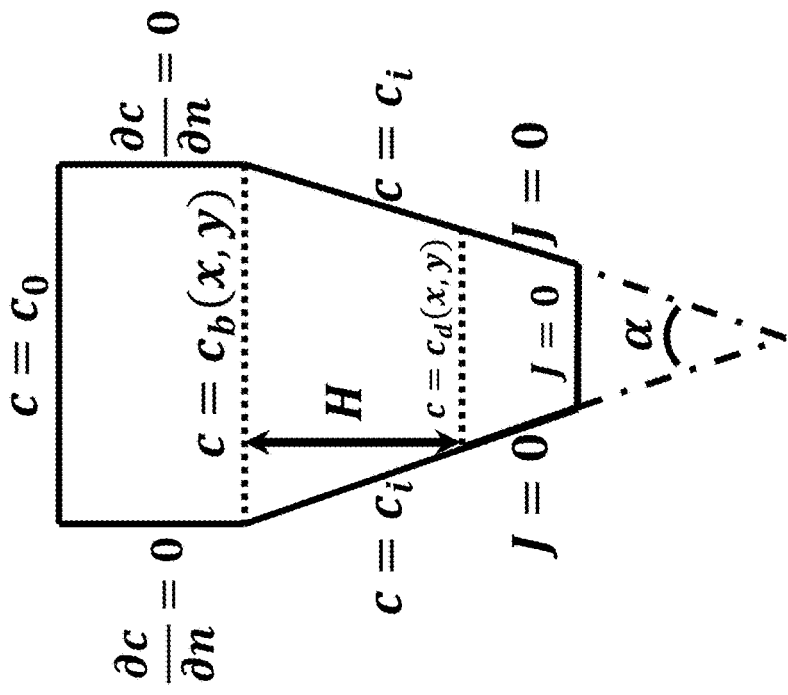
FIG. 4B is an analytical model that depicts evaporative boundary conditions in accordance with an illustrative embodiment.
Figure 4C:
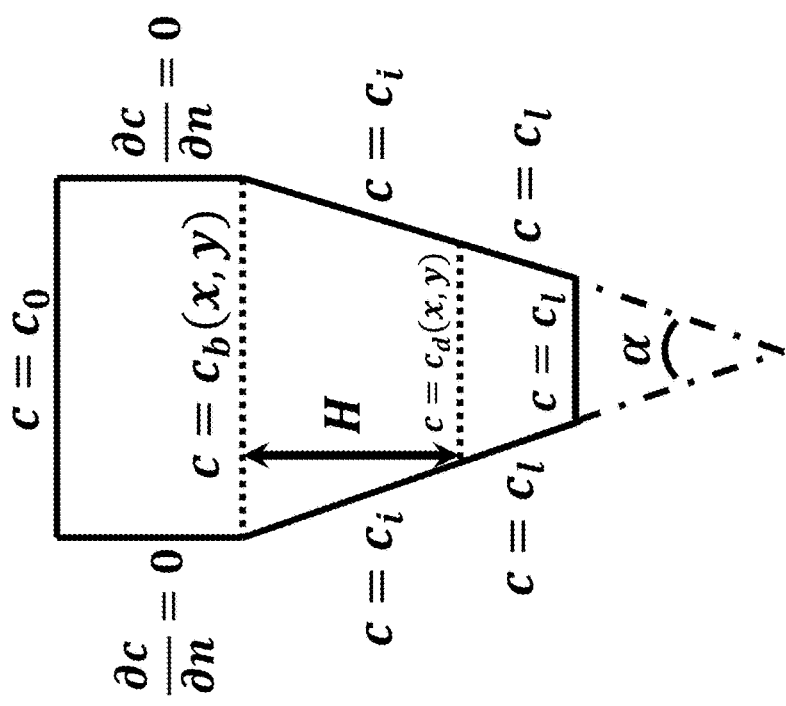
FIG. 4C is an analytical model that depicts no condensation boundary conditions in accordance with an illustrative embodiment.

The observations of FIG. 3 can be explained well with computer simulations of both flux and concentration. First, the inventors were interested in the hybrid time point where there is both solid ice and liquid water present. The inventors wanted to see under what conditions it would be possible to observe a frost-free zone. So using these boundary conditions, the flux field of incoming water vapor was simulated on the proposed surface design. FIG. 4A depicts early stage and late stage frost formation computer simulations of the proposed surface texture in accordance with an illustrative embodiment. The flux field can be simulated at any time along the frost propagation process, and so these two simulations show differences in how far the frost front has propagated. The inventors were interested especially in the direction of this net flux in the valley region, and as shown, depending on how far the frost has propagated downwards, the net flux either points upwards (signaling evaporation) or downwards (signaling continued condensation). This indicates a time at which one would expect a frost-free zone (if one can observe a net outwards flux in these regions in the simulations). Then, one can also predict the size of the frost-free zone based on where that frost/liquid front presents this net outwards flux. FIG. 4B is an analytical model that depicts evaporative boundary conditions in accordance with an illustrative embodiment. FIG. 4C is an analytical model that depicts no condensation boundary conditions in accordance with an illustrative embodiment.

However, for assessing long term stability, the inventors were more interested in simulating the concentration field of water vapor in the proposed surface texture. Additionally, the boundary conditions can be slightly changed to highlight that no liquid water is initially present—just frost. Here, the concentration is normalized based on supersaturation, so that one can tell what regions would be expected to see condensation. Also, as shown, the extent of the frost matters, and overlaps well with the flux simulations. The spatial location that allows for an outward flux also keeps the concentration of water vapor below a supersaturation, meaning that once the frost-free zone sets up, it will stay stable over long periods of time.

Figure 5A:
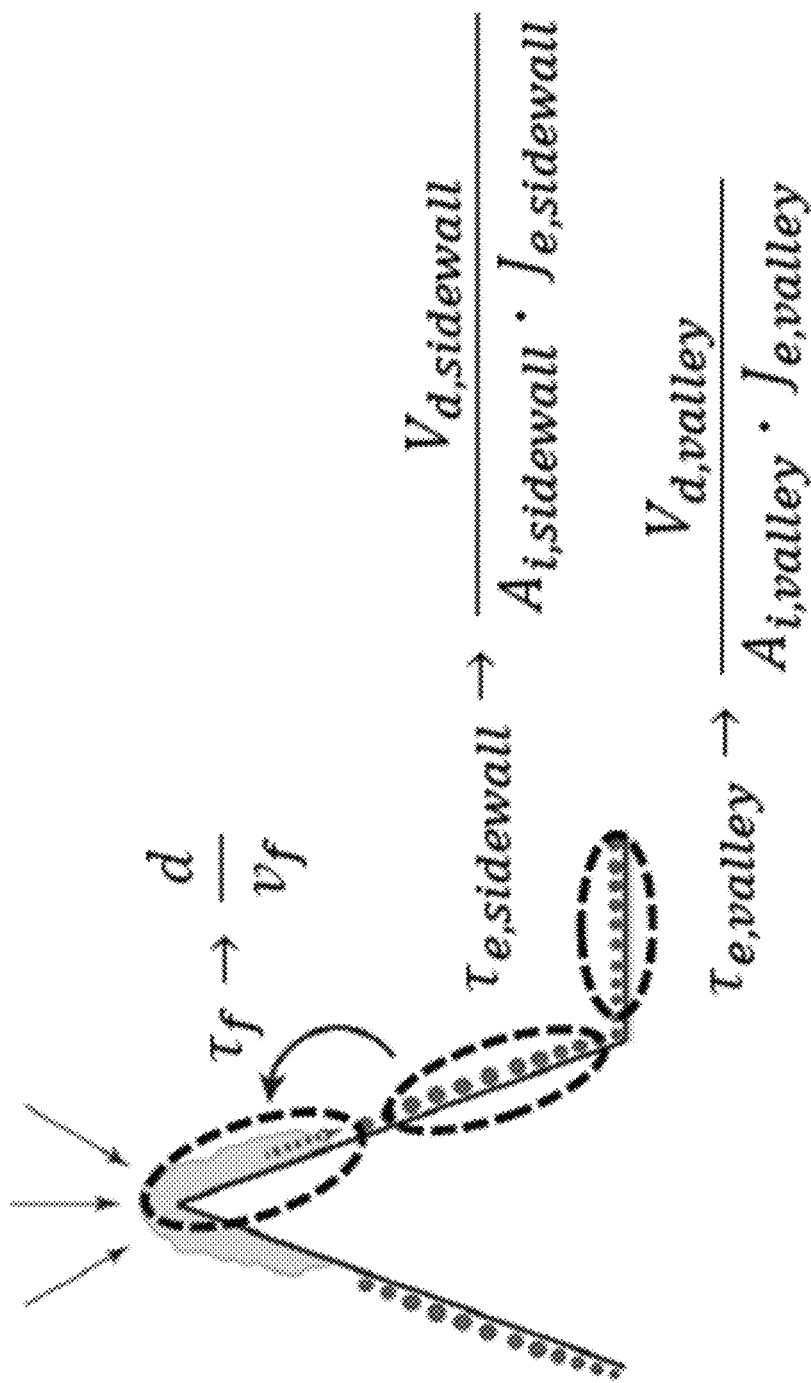
FIG. 5A depicts the timescale for frost propagation $\tau_f$ and the sidewall and valley components of the timescale for evaporation $\tau_e$ in accordance with an illustrative embodiment.

It is noted that the simulations only tell a part of the story. To understand the whole frost formation process, one can define some characteristic time scales. First, the time scale for frost propagation was considered. This is a measure of how long it takes for the frost front to propagate to its final state. Opposing that is the time scale of evaporation. The time scale of evaporation is highly dependent on (1) the droplet volume and (2) evaporative flux that these droplets are experiencing. Because these two parameters are going to be variable over the whole surface, the inventors tried to estimate this time scale into two main components: evaporation on the sidewall and evaporation in the valley. FIG. 5A depicts the timescale for frost propagation $\tau_f$, and the sidewall and valley components of the timescale for evaporation $\tau_e$ in accordance with an illustrative embodiment.

Figure 5B:
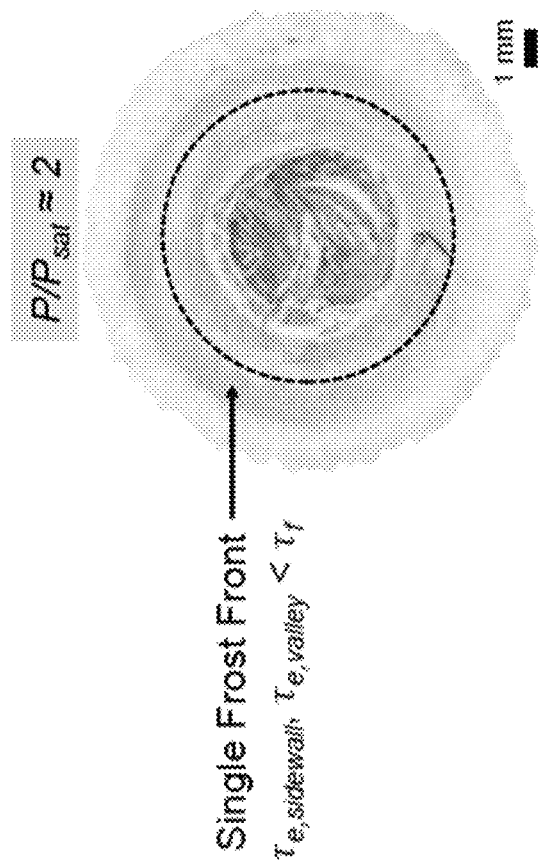
FIG. 5B depicts formation of a single frost front in accordance with an illustrative embodiment.
Figure 5C:
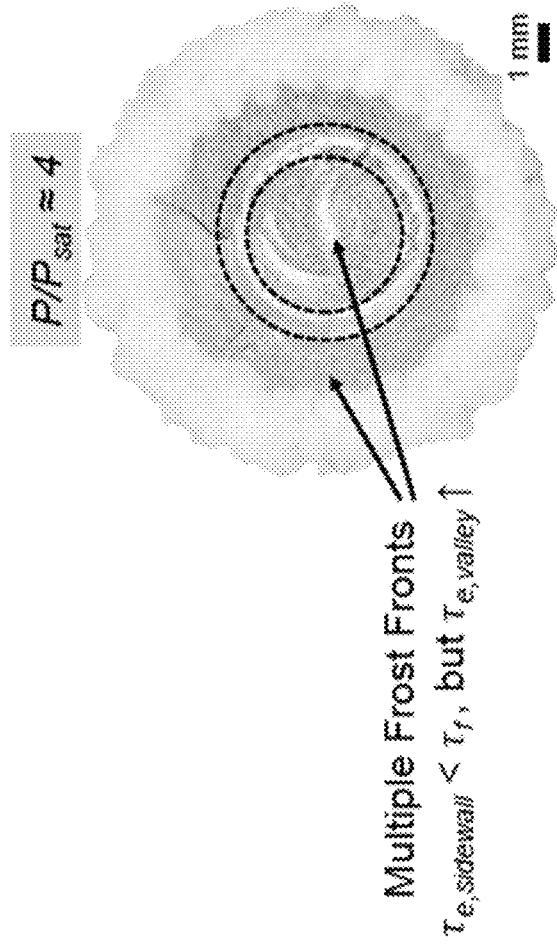
FIG. 5C depicts formation of multiple frost fronts in accordance with an illustrative embodiment.

If the evaporative time scales are both smaller than the frosting time scale, then the frost front stalls exactly as predicted by the simulations, as is the case with relatively low supersaturation. However, if the supersaturation is increased, there are multiple frost fronts, and this is a component that the simulations cannot predict. Here, the sidewall evaporative timescale is less than the freezing time scale, so the primary frost front that occurs on the serrations stalls. But now, the evaporative time scale in the valley becomes so large (as a result of having to overcome greater downwards flux), that an additional frost nuclei can form here, and propagate over the valley before the droplets can evaporate. This can be problematic because it greatly hinders the frost resistance of the surface, especially at large degrees of supersaturation. The inventors thus became interested in how to decrease the timescale of evaporation $\tau_e$. FIG. 5B depicts formation of a single frost front in accordance with an illustrative embodiment. FIG. 5C depicts formation of multiple frost fronts in accordance with an illustrative embodiment.

To address how to decrease timescale of evaporation $\tau_e$, the inventors explored hybridizing the surface texture, not only with material but with the length (L) scale. This exploration was based in part on leaf stoma, which are microscopic structures that can enable the exchange of vapor. The inventors selected graphene oxide (GO) doughs in an effort to achieve a similar exchange of vapor because they are composed of stacked GO flakes which are very good at adsorbing and storing water vapor within the interstitial spaces of these flakes. The inventors therefore incorporated a thin film of GO dough into the valley region of the surface texture, in order to reduce the problems with observing a large evaporative time scale there. By doing so, one can effectively replace the evaporative time scale in the valley with an adsorption time scale. And as it turns out, this adsorption occurred very quickly in the experiments conducted. As an unintended, but beneficial side effect of this addition, the evaporative time scale on the sidewall can be reduced by adding an additional source of local evaporation. A smaller evaporative time scale means the frost front stalls faster, thus resulting in a larger frost-free zone. In alternative embodiments, a substance other than GO may be used, including but not limited to hydrogels, zeolites, and metal-organic frameworks (MOFs).

Figure 6A:
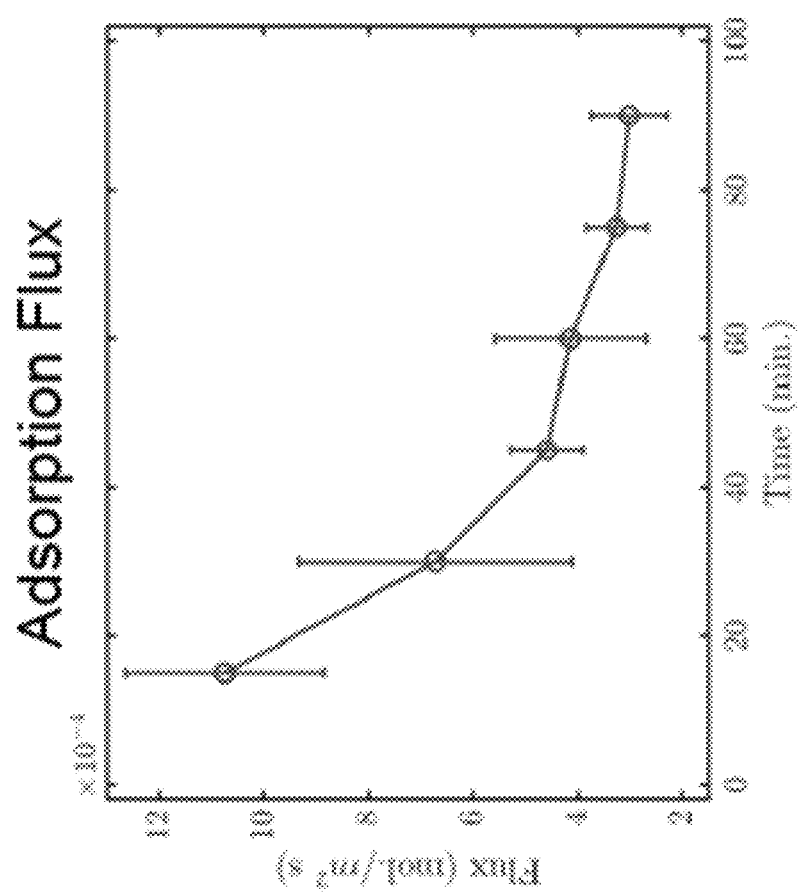
FIG. 6A depicts the adsorption flux relative to time for the surface texture with a graphene oxide coating in the valley in accordance with an illustrative embodiment.
Figure 6B:
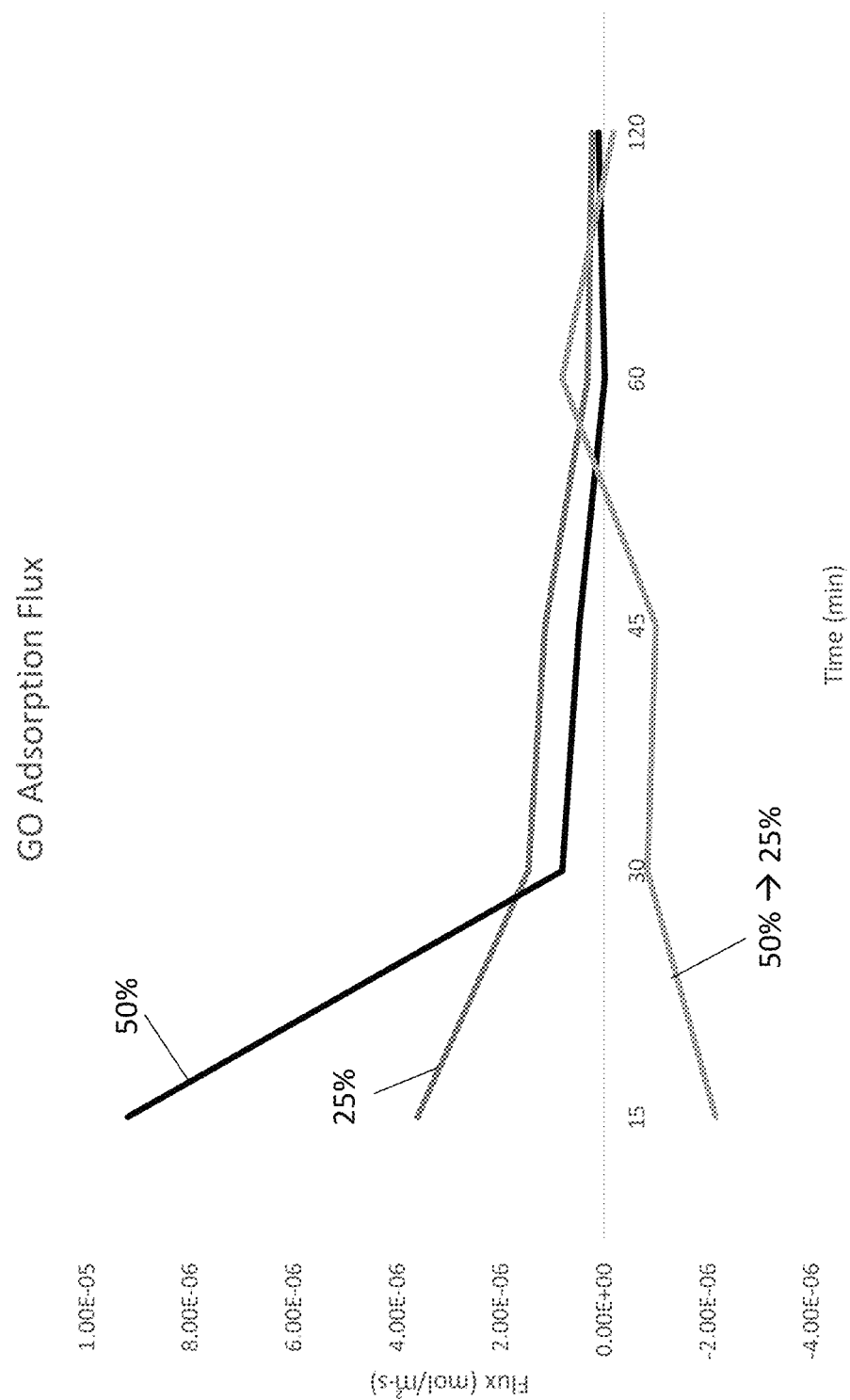
FIG. 6B depicts flux boundary conditions in accordance with an illustrative embodiment.

Specifically, addition of the GO to the valley of the proposed surface texture resulted in replacing $\tau_{e,valley}$, with $\tau_{ads}$ (or tau_adsorption). Additionally, as a result, $\tau_{e,sidewall}$ was reduced by the increasing evaporative flux. It was shown that a smaller $\tau_{e,sidewall}$ caused the frost front(s) to stall faster, which results in a larger frost free zone, phi. FIG. 6A depicts the adsorption flux relative to time for the surface texture with a graphene oxide coating in the valley in accordance with an illustrative embodiment. FIG. 6B depicts flux boundary conditions in accordance with an illustrative embodiment.

Figure 7A:
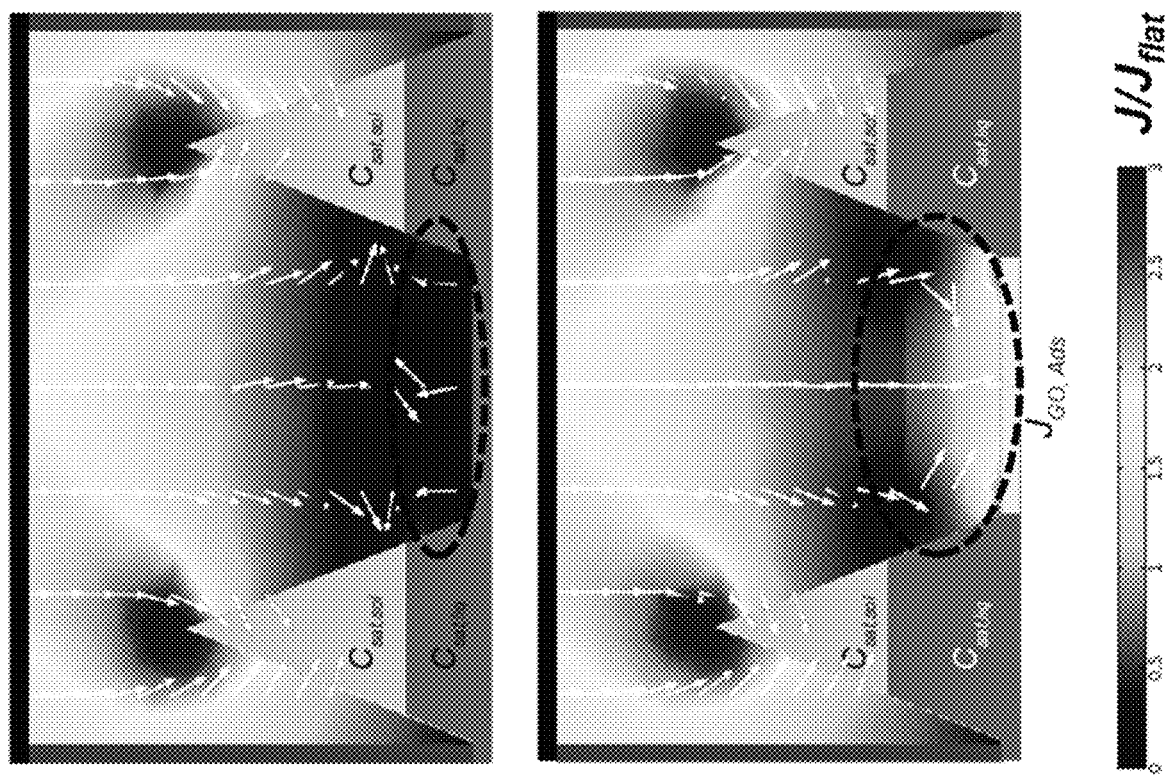
FIG. 7A depicts flux field simulations in accordance with an illustrative embodiment.

Effects of the use of GO can be shown in simulations of the flux field. FIG. 7A depicts flux field simulations in accordance with an illustrative embodiment. In FIG. 7A, the top simulation is identical to that which was discussed earlier on the uniform surface. In the bottom simulation, the boundary conditions were changed slightly such that in the valley, the inventors incorporated an adsorption flux of GO that matches in magnitude what was experimentally measured. A point of interest is again in the direction of flux within the central valley area. As a result of the boundary condition that was specifically applied to the valley, that flux will always be pointed downwards. However, what signals the frost resistance is an outwards flux that occurs on the sidewalls. In every instance, this transition can be observed when the frost/liquid line is higher up on the serration than in the uniform case, signaling a larger frost free zone across all operating conditions.

Figure 7C:
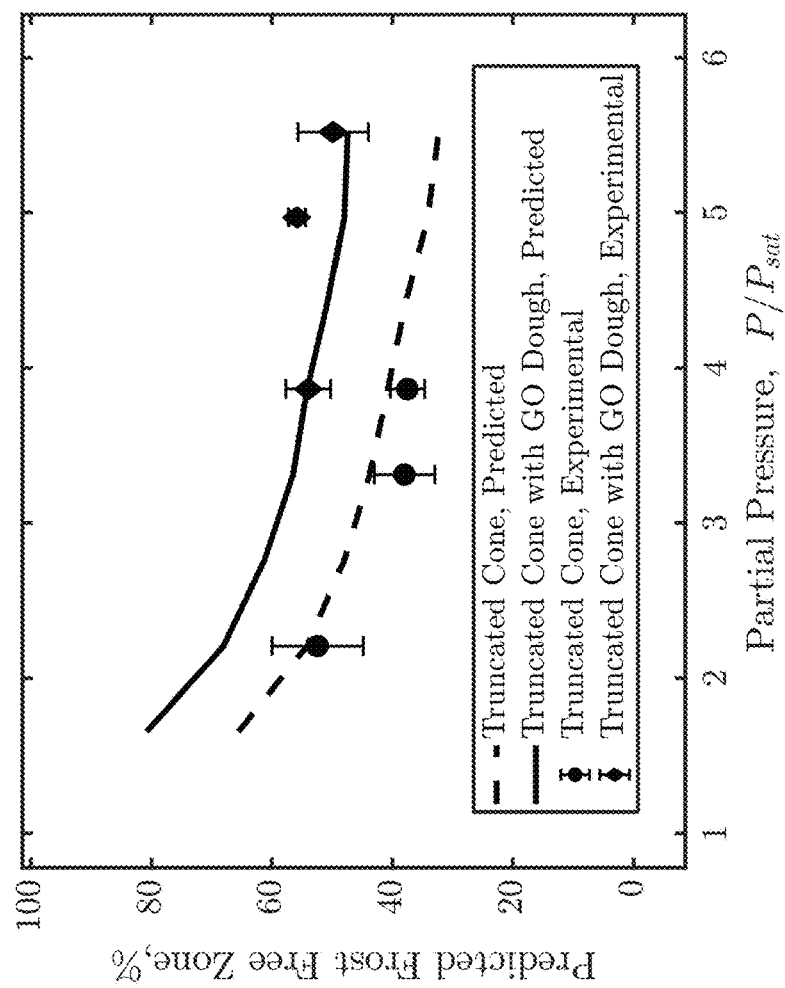
FIG. 7C is a plot of all simulation predictions for the uniform surface and the hybrid surface in accordance with an illustrative embodiment.
Figure 7B:
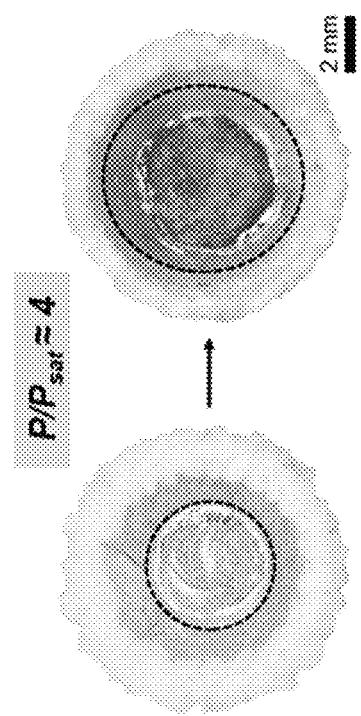
FIG. 7B is an example from one of the conducted experiments showing just how much of an increase in phi that was able to be achieved by hybridizing the surface with GO in accordance with an illustrative embodiment.

FIG. 7B is an example from one of the conducted experiments showing just how much of an increase in phi that was able to be achieved by hybridizing the surface with GO in accordance with an illustrative embodiment. Additionally, the addition of GO also got rid of the problem of having multiple frost fronts. FIG. 7C is a plot of all simulation predictions for the uniform surface and the hybrid surface in accordance with an illustrative embodiment. As shown, a significant increase in anti-frosting potential can be attributed to the addition of GO. Additionally, this is the region where the uniform surfaces experienced multiple frost fronts, and so their real frost resistance is actually much lower than what was predicted by the simulations. Adding GO also enables operation of these surfaces in this range of conditions, thus extending the viability. Further, on the other end, it can be seen that below a critical supersaturation, the surface should have near 100% frost resistance over multiple hours.

Figure 8:
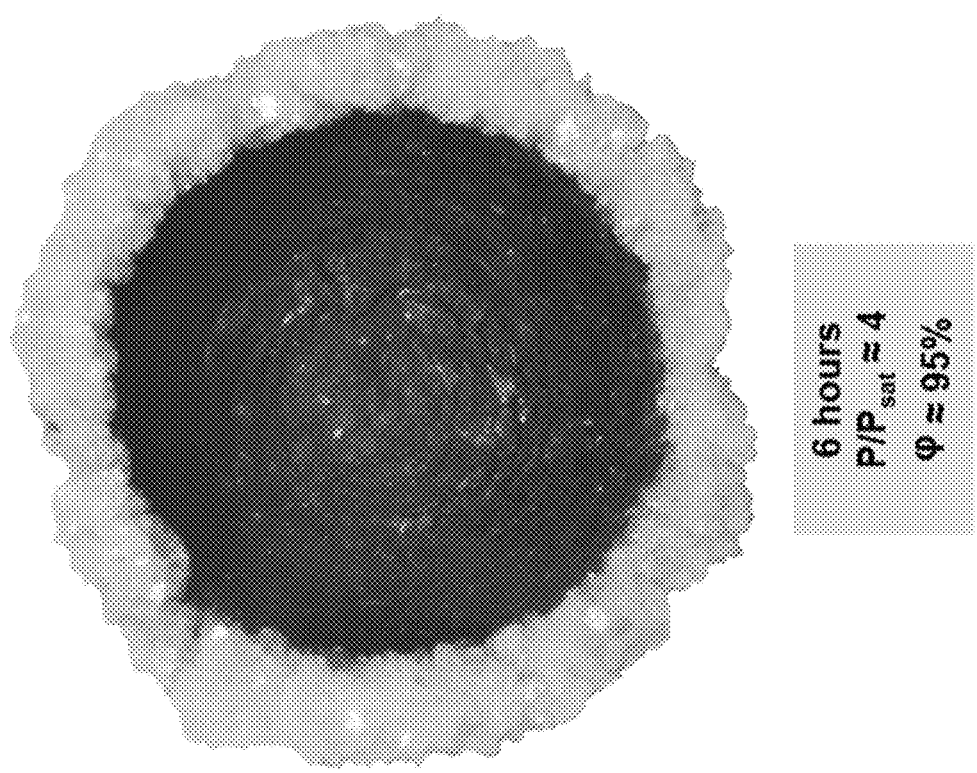
FIG. 8 is another example of how the application of graphene oxides maximizes frost resistance in accordance with an illustrative embodiment.
Figure 9:
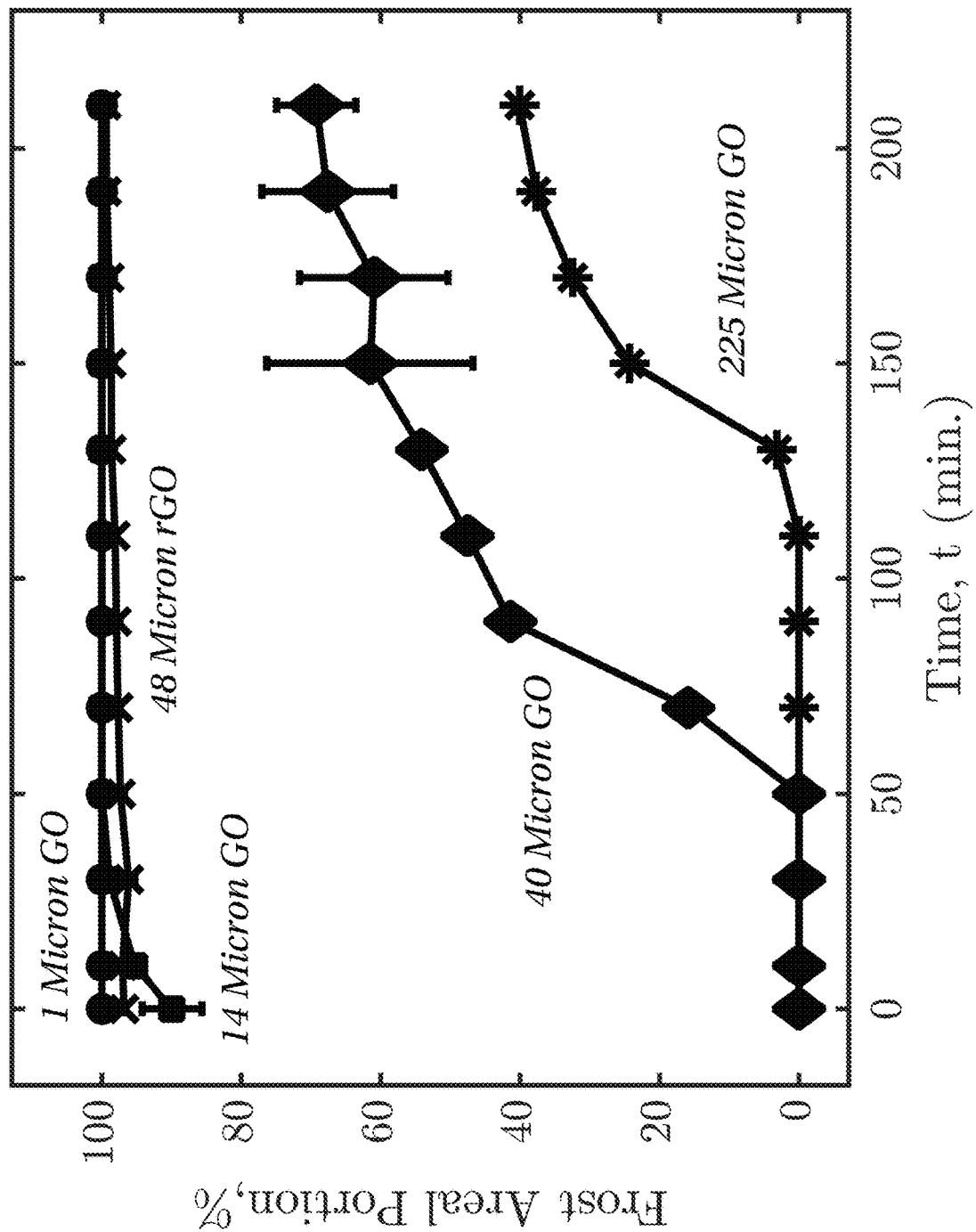
FIG. 9 depicts the effect of GO thickness and oxidation in accordance with an illustrative embodiment.

FIG. 8 is another example of how the application of graphene oxides maximizes frost resistance in accordance with an illustrative embodiment. It was found that covering the entire surface with GO increases the short-term frost resistance as compared to only placing GO in the valley. This is due to GO adsorbing and storing most of the water vapor at the peaks rather than having water vapor turn directly to frost. However, once the GO becomes saturated, it can adsorb no more vapor, and behaves similarly to an impermeable surface, meaning frost resistance will gradually decay over time (~24+ hours). It was also found that frost formation can be effectively reduced by increasing a thickness of the GO layer and/or by increasing the oxidation level (quantified by decreasing the ratio of carbon-carbon bonds to carbon-oxygen bonds from greater than 2 to less than 1). Example GO layer thicknesses include 0.5 micron, 1 micron, 10 micron, 14 micron, 20 micron, 40 micron, 48 micron, 75 micron, 100, micron, 150 micron, 225 micron, 300 micron, etc. FIG. 9 depicts the effect of GO thickness and oxidation in accordance with an illustrative embodiment.

Figure 10B:
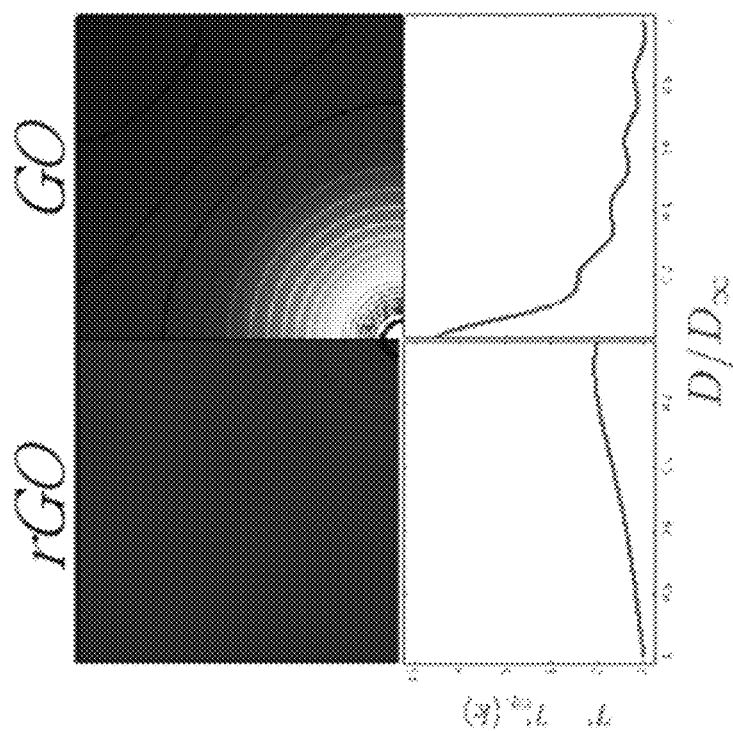
FIG. 10B depicts in-plane anisotropic heat transfer in accordance with an illustrative embodiment.
Figure 10A:
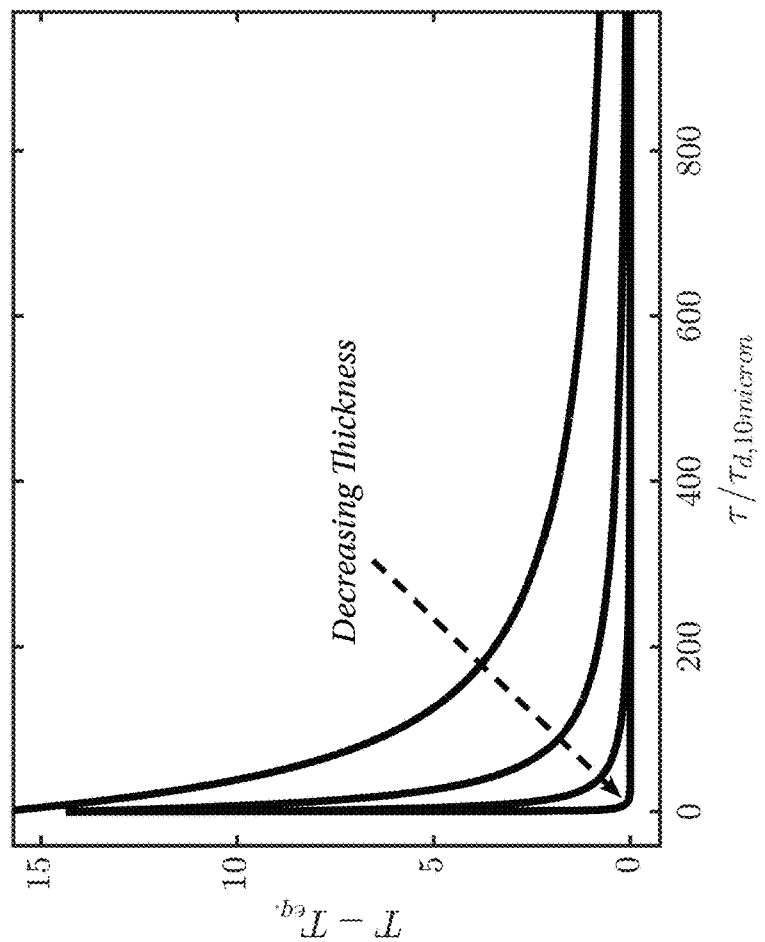
FIG. 10A depicts through-plane anisotropic heat transfer in accordance with an illustrative embodiment.

Graphene oxide is different from traditional insulating materials in that it has anisotropic heat transfer (through-plane and in-plane). With respect to through-plane anisotropic heat transfer, for thicker substrates, latent heat of condensation (or freezing) takes longer to dissipate through the flakes. For more oxidized samples, the in-plane heat transfer decreases, meaning the latent heat remains more focused near the droplet and creates a larger degree of local heating than for rGO. FIG. 10A depicts through-plane anisotropic heat transfer in accordance with an illustrative embodiment. FIG. 10B depicts in-plane anisotropic heat transfer in accordance with an illustrative embodiment.

Thus, described herein is a surface texture design that incorporates the unique combination of 3D macro textures with 2D nano-materials to result in an area that stably resists the formation of frost/ice as well as other condensable vapors over long terms. The surface design incorporates macro-textured serrations that can manipulate the diffusion field of condensable vapors (i.e., water, ethanol, metals, plasma, etc.), resulting in a non-uniform layer of condensed matter on the surface. While the simulations described herein were performed using water (in the form of vapor, liquid, and solid), it is to be understood that this diffusion field can be generalized to all condensable vapors because it takes advantage of (1) focused diffusion flux and (2) the difference in saturation vapor pressure of different phases. A small layer of graphene oxide paste, or similar permeable 2D material (or alternatively a 3D lattice like metal organic frameworks), is deposited in the valley region of the surface texture to further manipulate the overall diffusion field by adsorbing or desorbing vapor from the atmosphere. The combination of both components results in a surface that has a sacrificial region of deposition, and a region that remains completely undeposited.

Controlling and reducing diffusion limited growth of material is critical for numerous applications. The most prevalent example material is frost/ice, which can promote numerous mechanical stresses, undesired fluid mechanical properties, optical/wave diffraction, and heat transfer insulation, all of which should be avoided in most applications. Additionally, selectively controlling the deposition of material based on diffusion can be very beneficial for manufacturing processes, such as central processor unit (CPU) fabrication. As such, the proposed surface texture designs combine a macro-textured topology in conjunction with a two-dimensional heterogeneous material to create a region that is stable in repelling the formation of condensable vapors. This deposition free region can be the majority region of the surface (in terms of area), which can result in the substantial reduction in material-related complications as well as a high degree of control of deposition selectivity.

As discussed herein, surfaces that are exposed to freezing conditions often result in frost/ice adhesion. This can be realized by frost formation on aircraft wings, which poses a serious danger, or frost formation in freezers, which poses a significant decrease in thermal efficiency, among other problems. Beyond frost/ice, selective deposition of materials is also critically important for a variety of manufacturing techniques, such as the fabrication of CPU chips and battery cells. The design parameters that promote an anti-frost/ice region also can be utilized to promote a region without any material deposition (i.e. Silicon, Lithium), thus focusing all material deposition selectively.

Applications of the proposed surface texture designs include aircraft wings, municipal power lines, satellite lines, satellite dishes, optical applications, photography, microscopy, autonomous aerial devices, vehicles (e.g., drones), sensors (from infrared to visible light regimes), CPU fabrication, etc. The frost-free region is planar, and such a design results in an increased heat transfer coefficient for low temperature heat exchangers. The proposed design can also reduce optical diffraction associated with frost crystals and reduce mechanical stresses caused by shear and excessive weight.

Figure 11:
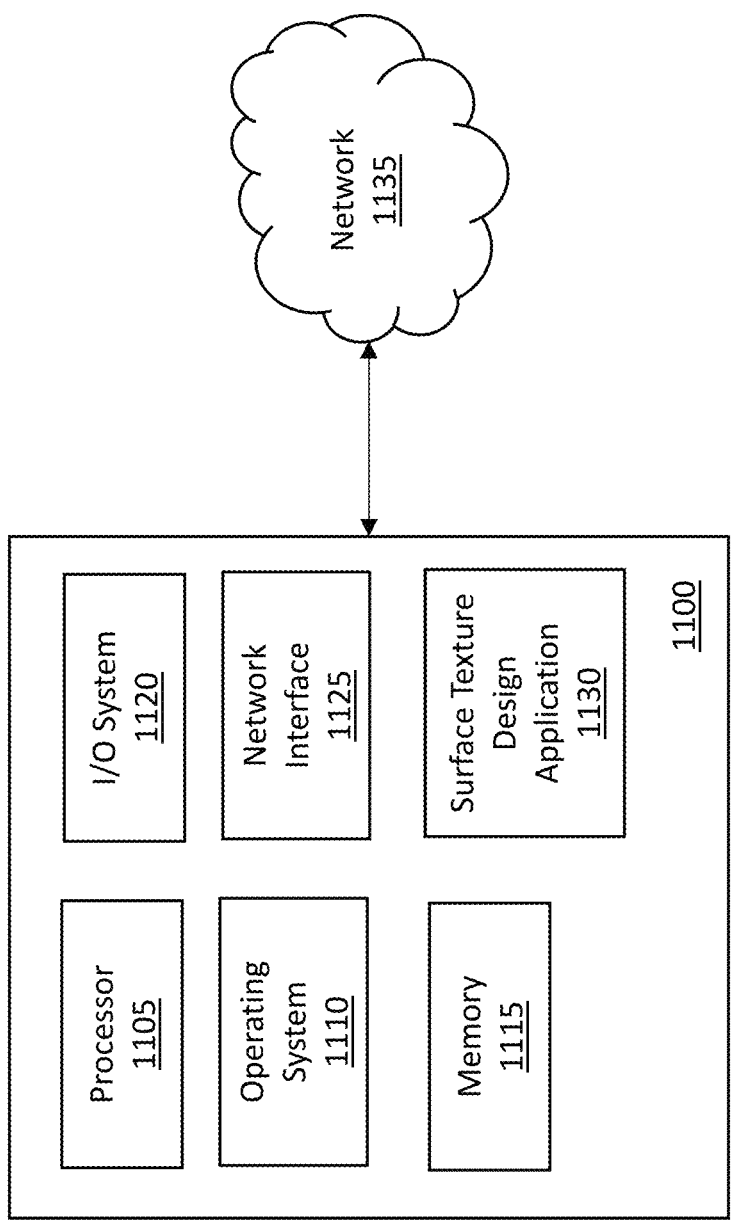
FIG. 11 is a block diagram of a computing system to implement a surface texture design system in accordance with an illustrative embodiment.

In an illustrative embodiment, a computing system can be used to generate the design for a desired surface texture based on user criteria and specifications. As an example, FIG. 11 is a block diagram of a computing system 1100 to implement a surface texture design system in accordance with an illustrative embodiment. In an embodiment in which design parameters and specifications are received remotely or in which a design is to be sent to a remote location, the computing system 1100 can communicate through a network 1135.

The computing system 1100 includes a processor 1105, an operating system 1110, a memory 1115, an input/output (I/O) system 1120, a network interface 1125, and a surface texture design application 1130. In alternative embodiments, the computing system 1100 may include fewer, additional, and/or different components. The components of the computing system 1100 communicate with one another via one or more buses or any other interconnect system. The computing system 1100 can be any type of computing device (e.g., tablet, laptop, desktop, etc.) that has sufficient processing power to perform the operations described herein.

The processor 1105 can be in electrical communication with and used to control any of the system components described herein. For example, the processor can be used to execute the surface texture design application 1130, process received user selections and parameters for the design, etc. The processor 1105 can be any type of computer processor known in the art, and can include a plurality of processors and/or a plurality of processing cores. The processor 1105 can include a controller, a microcontroller, an audio processor, a graphics processing unit, a hardware accelerator, a digital signal processor, etc. Additionally, the processor 1105 may be implemented as a complex instruction set computer processor, a reduced instruction set computer processor, an x86 instruction set computer processor, etc. The processor 1105 is used to run the operating system 1110, which can be any type of operating system.

The operating system 1110 is stored in the memory 1115, which is also used to store programs, user data, network and communications data, peripheral component data, the surface texture design application 1130, and other operating instructions. The memory 1115 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc. In some embodiments, at least a portion of the memory 1115 can be in the cloud to provide cloud storage for the system. Similarly, in one embodiment, any of the computing components described herein (e.g., the processor 1105, etc.) can be implemented in the cloud such that the system can be run and controlled through cloud computing.

The I/O system 1120 is the framework which enables users and peripheral devices to interact with the computing system 1100. The I/O system 1120 can include a display, one or more speakers, one or more microphones, a keyboard, a mouse, one or more buttons or other controls, etc. that allow the user to interact with and control the computing system 1100. The I/O system 1120 also includes circuitry and a bus structure to interface with peripheral computing devices such as power sources, universal service bus (USB) devices, data acquisition cards, peripheral component interconnect express (PCIe) devices, serial advanced technology attachment (SATA) devices, high definition multimedia interface (HDMI) devices, proprietary connection devices, etc. As another example, the I/O system 1120 can communicate with a 3D printer to control printing of one or more surface textures.

The network interface 1125 includes transceiver circuitry (e.g., a transmitter and a receiver) that allows the computing system 1100 to transmit and receive data to/from other devices such as remote computing systems, servers, websites, etc. The network interface 1125 enables communication through the network 1135, which can be one or more communication networks. The network 1135 can include a cable network, a fiber network, a cellular network, a wi-fi network, a landline telephone network, a microwave network, a satellite network, etc. The network interface 1125 also includes circuitry to allow device-to-device communication such as Bluetooth® communication.

The surface texture design application 1130 can include software and algorithms in the form of computer-readable instructions which, upon execution by the processor 1105, performs any of the various operations described herein such as receiving a desired specification or determining a parameter that satisfies a desired specification for a surface texture. For example, the processor 1105 can receive/determine values such as height (h) of the surface texture, length (L) of the valley of the surface texture, vertex angle (alpha) of the surface texture, a desired frost resistance ratio (phi) for the surface texture, a thickness of a graphene oxide layer to be applied to the surface texture, a location on which to apply the graphene oxide layer, a number of surface textures needed to cover a surface, a location on an object in which to position the surface textures, etc. to generate a surface texture design. The surface texture design application 1130 can utilize the processor 1105 and/or the memory 1115 as discussed above. In an alternative implementation, the surface texture design application 1130 can be remote or independent from the computing system 1100, but in communication therewith.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A surface texture comprising:
   a three-dimensional structure, a cross-section of which includes a first serration and a second serration, wherein:
   the first serration has a first peak having a height measured from a base of the three-dimensional structure to a top of the first serration;
   a valley is formed in between the first serration and the second serration, wherein the valley has a length measured from a base of the first serration to a base of the second serration; and the first serration has a vertex angle that forms the first peak, wherein the height and the vertex angle are controlled such that freezing of condensate begins at the first peak; and a water adsorbing coating that covers only the valley such that the water adsorbing coating is not included on the first serration or the second serration, wherein the water adsorbing coating helps the valley to remain free of frost.

2. The surface texture of claim 1, wherein the coating comprises a two-dimensional nano-coating.

3. The surface texture of claim 2, wherein the two-dimensional coating comprises a graphene oxide coating.

4. The surface texture of claim 1, wherein the coating has a thickness between 1 micron and 225 microns.

5. The surface texture of claim 1, wherein the coating covers all of the valley.

6. The surface texture of claim 1, wherein an exterior surface of the three-dimensional structure has a shape of a truncated cone.

7. The surface texture of claim 1, wherein the height of the first peak is between 0.5 millimeters (mm) and 10 mm.

8. The surface texture of claim 1, wherein the length of the valley is between 3 millimeters (mm) and 10 mm.

9. The surface texture of claim 1, wherein the water adsorbing coating is configured to manipulate an overall diffusion field of the surface texture by adsorbing vapor from the atmosphere.

10. The surface texture of claim 1, wherein the valley is planar such that the three-dimensional structure includes a planar frost free zone.

11. The surface texture of claim 1, wherein the freezing of condensate propagates from the first peak down toward the valley.

12. The surface texture of claim 11, wherein during propagation of the freezing condensate from the first peak down toward the valley, the condensate is present on the three-dimensional structure as both a solid and a liquid.

13. The surface texture of claim 12, wherein the presence of the condensate on the three-dimensional structure as both the solid and the liquid generates a concentration gradient that forms as a result of a difference between a first saturation pressure of the solid and a second saturation pressure of the liquid, and wherein the concentration gradient causes evaporation of condensate present in the valley.

* * * * *